United States Patent [19]

Morishita et al.

[11] Patent Number: 4,679,932
[45] Date of Patent: Jul. 14, 1987

[54] METHOD OF AND APPARATUS FOR MEASURING MOVING VELOCITY OF LINEAR OBJECT MOVING AND VIBRATING

[75] Inventors: Koji Morishita; Hujio Hirose, both of Nagaokakyo; Nobuo Nakatsuka; Masahiro Nishimura, both of Kyoto, all of Japan

[73] Assignee: Omron Tateisi Electronics Co., Kyoto, Japan

[21] Appl. No.: 628,314

[22] Filed: Jul. 6, 1984

[30] Foreign Application Priority Data

Jul. 7, 1983 [JP] Japan .............................. 58-124271

[51] Int. Cl.$^4$ .............................................. G01P 3/36
[52] U.S. Cl. ....................................... 356/28; 356/27; 356/28.5
[58] Field of Search .......................... 356/27, 28, 28.5

[56] References Cited

U.S. PATENT DOCUMENTS 4,312,592 1/1982 Sabater et al. ..................... 356/28

OTHER PUBLICATIONS

T. Asakura and N. Takai, "Dynamic Laser Speckles and Their Application To Velocity Measurements of the Diffuse Object", 1981, Appl. Phys. 25 179-194.

Primary Examiner—Stephen C. Buczinski
Assistant Examiner—Aaron J. Lewis
Attorney, Agent, or Firm—Stevens, Davis, Miller & Mosher

[57] ABSTRACT

A method of measuring the moving velocity of a linear object which is moving while vibrating, the method comprising the steps of illuminating the linear object with a flat laser beam having a width larger than the amplitude of vibration, the linear object moving in the direction of its length and vibrating perpendicular to the longitudinal direction; receiving the scattered light from the linear object by a photoelectric conversion device through a finite-sized elliptic or slit aperture disposed with the direction of its minor axis matching the direction of movement of the linear object; and cutting off the d.c. component of a speckle signal from the photoelectric conversion device, counting the number of zero-crossings per second of the resulting signal and converting the count value to a signal representing the longitudinal moving velocity of the linear object.

3 Claims, 10 Drawing Figures

METHOD OF AND APPARATUS FOR MEASURING MOVING VELOCITY OF LINEAR OBJECT MOVING AND VIBRATING

BACKGROUND OF THE INVENTION

1. Field of the Invention

The present invention relates to a method of and an apparatus for measuring the moving velocity of a linear object such as a thread, metal wire or optical fiber, and more particularly to a method and an apparatus resorting to a technique for measuring the moving velocity of a linear object by illuminating the object with a laser beam to obtain a speckle pattern through a finite-sized aperture, converting the pattern to an electric signal and counting the number of zero-crossings per second of the signal after cutting off the d.c. component thereof.

2. Description of the Prior Art

Such a method of measuring the velocity of a moving object is described, for example, in Applied Physics, 25., 179–194(1981), particularly pp. 191–194, as the "Zero-Crossing Method." When an elliptic aperture or slit aperture is used as the finite-sized aperture, it is possible to detect not only the velocity of the moving object but also the direction of movement of the object.

However, the conventional method, in which a thin laser beam of circular cross section is used, has the following two drawbacks when measuring the velocity of a linear object which is moving in the direction of its length while vibrating.

(1) The circular spot of the laser beam is small and unable to illuminate the entire range of the amplitude of vibration of the linear object which is vibrating perpendicular to its length. If a large spot is used to cover the entire amplitude range, the laser beam has a reduced intensity (per unit area). Further because the laser beam produces a circular spot, the length of the illuminated portion of the vibrating linear object varies from position to position, making it impossible to afford accurate velocity measurements.

(2) The velocity measured is the resultant of a velocity component in the longitudinal direction of the object and a vibration velocity component, so that it is impossible to measure the longitudinal velocity component alone accurately.

SUMMARY OF THE INVENTION

The main object of the present invention is to provide a method of and an apparatus for accurately measuring the velocity of a moving linear object in the direction of its length even when the object is vibrating perpendicular to the longitudinal direction.

To fulfill the above object, the present invention provides a method of measuring the moving velocity of a linear object which is moving while vibrating, the method comprising the steps of illuminating the linear object with a flat laser beam having a width larger than the amplitude of vibration, the linear object moving in the direction of its length and vibrating perpendicular to the longitudinal direction; receiving the scattered light from the linear object by a photoelectric conversion device through a finite-sized elliptic or slit aperture disposed with the direction of its minor axis matching the direction of movement of the linear object; and cutting off the d.c. component of a speckle signal from the photoelectric conversion device, counting the number of zero-crossings per second of the resulting signal and converting the count value to a signal representing the longitudinal moving velocity of the linear object. The direction of the width of the flat laser beam is perpendicular to the direction of the length of the linear object.

The linear object, which is vibrating within the width of the flat laser beam, can be illuminated with the laser beam at all times, permitting measurement of its velocity. It is also possible to use a flat laser beam of increased intensity. Because the length or area of the portion of the linear object illuminated with the laser beam (i.e. illuminated region) is substantially constant at all times, the velocity can be measured accurately. The photoelectric conversion device is adapted to receive the scattered light from the linear object through a finite-sized elliptic or slit aperture which is so positioned that the direction of its minor axis matches the direction of the length of the liner object, so that the longitudinal velocity component of the linear object can be measured with a reduced error by virtue of the cosine characteristics to be described later.

DESCRIPTION OF THE PREFERRED EMBODIMENT

Figure 1:
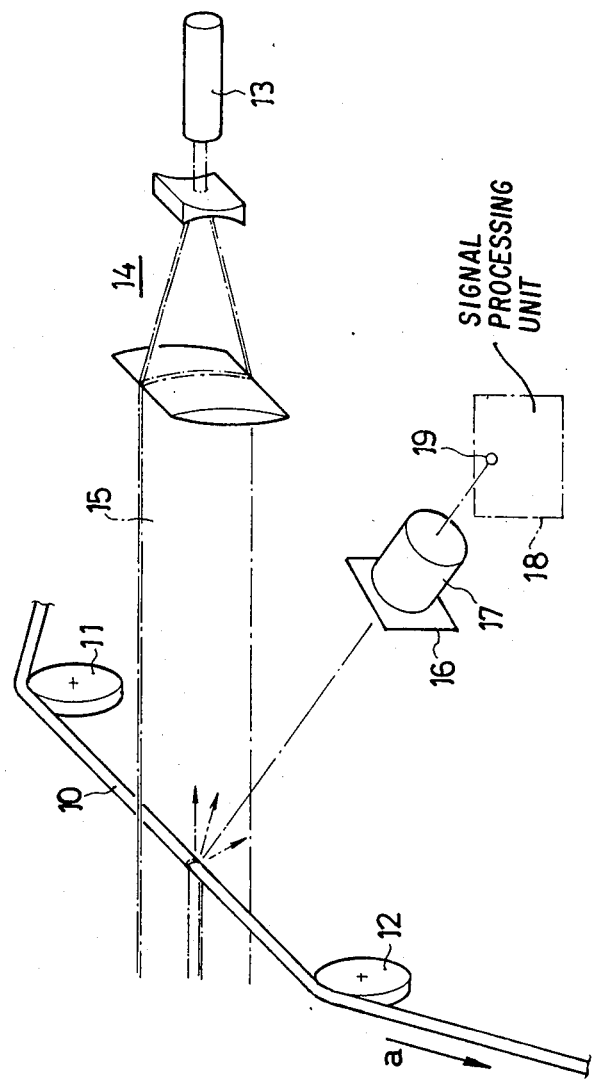
FIG. 1 is a diagram schematically showing a velocity measuring apparatus embodying the invention.

FIG. 1 is a diagram showing a velocity measuring apparatus embodying the present invention and including an optical system. With reference to this drawing, a linear object 10 the velocity of which is to be measured is passed over rollers 11 and 12 and is moving in the direction of arrow a at a velocity $V_L$. A laser light source 13, which comprises a semiconductor laser or the like, produces a laser beam, which is formed into a flat laser beam 15 of large vertical width by an optical system 14. The laser beam 15 is projected on the linear object 10 perpendicular thereto. The flat beam forming optical system 14 comprises, for example, cylindrical lenses in combination. The scattered light from the linear object 10 is received by a photodiode 17. Disposed on the front side of the photodiode 17 is an opaque plate or film 16 formed with a finite-sized elliptic aperture 16a. The finite-sized aperture 16a is so positioned that the direction of its minor axis (X-direction) matches the direction of movement of the linear object 10. The output of the photodiode 17 is fed to a signal processing unit 18.

Figure 2:
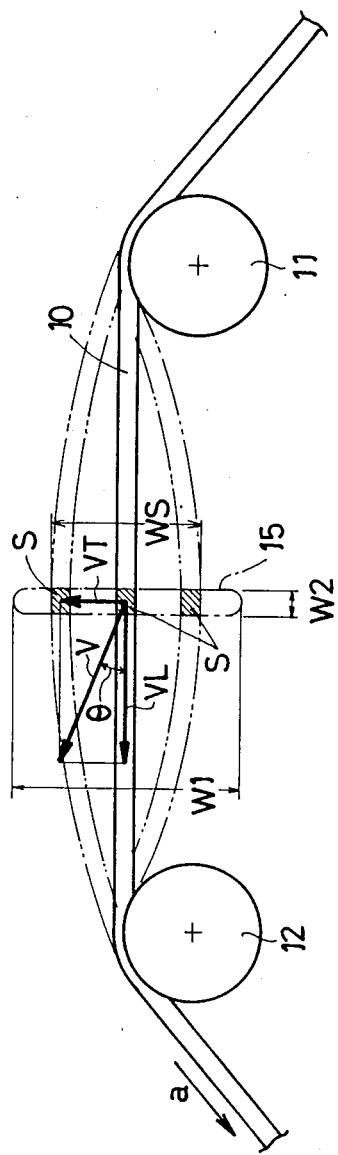
FIG. 2 is a diagram for illustrating the influence of vibration of a linear object on the moving velocity of the object.
Figure 3:
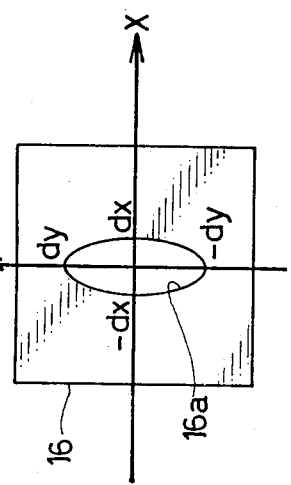
FIG. 3 is a front view showing an opaque plate or film having a finite-size elliptic aperture incorporated in the apparatus.

FIG. 2 shows the linear object 10 passed over the rollers 11 and 12 and as seen in the direction of propagation of the laser beam 15, on a plane perpendicular to the propagation direction. As indicated in broken lines, the linear object 10 between the rollers 11 and 12 is vibrating perpendicular to the direction of movement (length) of the linear object 10. The term the "direction of movement (length) of the linear object 10" means the direction through the two rollers 11 and 12 (i.e. the direction of the length of the linear member 10 indicated in solid lines between the rollers 11 and 12). Suppose the velocity component in the direction of movement of the linear object 10 is $V_L$, the velocity component of the vibration is $V_T$ and the resultant of these velocity components is V. When the velocity component $V_L$ and the resultant velocity V are represented by vectors and the angle between these velocity vectors is $\theta$, $$V_L = V \cos \theta \qquad (1)$$

The velocity components of the vibration include, in addition to the velocity component $V_T$ in the plane of FIG. 2, a velocity component perpendicular to the plane of FIG. 2 (in the direction of propagation of the laser beam 15). However, it is known that the latter velocity component is negligible in the case of measurement by the present apparatus, so that the velocity component $V_T$ only needs to be considered.

As seen in FIG. 2, the cross section of the flat laser beam 15 is slender and has a width $W_1$ and a thickness $W_2$. The width $W_1$ is set to a larger value than the amplitude $W_S$ of the vibration of the linear object 10. The thickness $W_2$ is uniform over the entire amplitude $W_S$.

The laser beam 15 illuminating the linear object 10 is flat, the direction of the width of the beam is perpendicular to the direction of movement (length) of the linear object 10, and the width of the flat laser beam 15 is larger than the amplitude $W_S$ of the vibration, so that the linear object 10 is illuminated with the laser beam 15 at all times. Since the thickness $W_2$ is uniform, the length or area of the illuminated portion of the linear object 10 (hatched in FIG. 2 and hereinafter referred to as "illuminated region S") is constant at all times irrespective of the position of the vibrating linear object. If the size of the illuminated region S varies, the average size of speckles, $\Delta x$, also varies, making it impossible to accurately measure the velocity. Accordingly it is critical that the illuminated region have a constant size.

Figure 4:
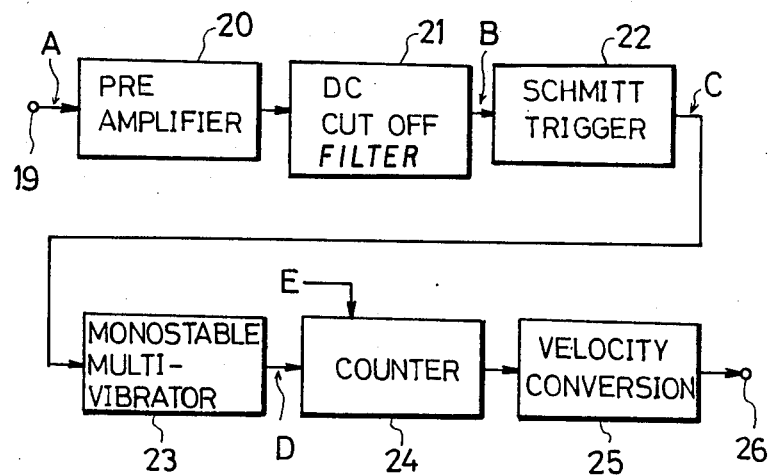
FIG. 4 is a block diagram showing a signal processing unit included in the apparatus.

The signal processing unit 18 is shown in greater detail in FIG. 4. This unit 18 comprises an input terminal 19, a preamplifier 20 connected to the input terminal 19, a d.c. cutoff filter 21 connected to the preamplifier 20, a Schmitt trigger 22 connected to the filter 21, a monostable multivibrator 23 connected to the Schmitt trigger 22, a counter 24 connected to the vibrator 23, a velocity conversion circuit 25 connected to the counter 24, and an output terminal 26 connected to the circuit 25.

The operation of the present apparatus will now be described for measuring the moving velocity of the linear object 10.

Figure 6A:
FIGS. 6 A–E is a time chart showing signal waveforms for illustrating the apparatus.
Figure 6B:
Figure 6C:
Figure 6D:
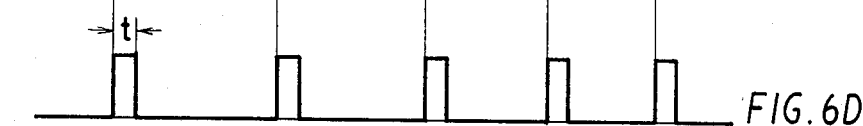
Figure 6E:
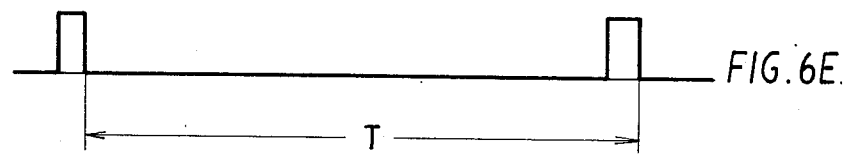

When the moving linear object 10 is illuminated with the flat laser beam 15 afforded by the laser light source 13, the beam is scattered. Since the flat laser beam 15 has a width sufficiently larger than the amplitude of the vibration of the linear object, the beam 15 strikes the vibrating object 10 without any failure. The scattered light impinges on the photodiode 17 through the finite-sized aperture 16a and is converted to an electric signal (speckle pattern). The speckle pattern is spatially integrated on the area defined by the finite-size aperture 16a, so that a noise-free electric signal is delivered from the photodiode 17 as seen in FIG. 6A. The signal A is fed to the input terminal 19 of the signal processing unit 18. The signal, still containing a d.c. component, is amplified in the preamplifier 20 and then fed to the d.c. cutoff filter 21, whereby the d.c. component is cut off, giving an output signal B shown in FIG. 6B and having zero-crossings. The signal B is fed to the Schmitt trigger 22, which in turn produces a signal C (FIG. 6C). While the signal B is above the Schmitt level (set approximately to zero), the signal C has a high level. The output signal C from the trigger 22 is fed to the monostable multivibrator 23 and is converted to a pulse signal having the high level only for a period of time t upon the rise of the signal C (FIG. 6B). The puloco of the signal D correspond to the zero-crossings. Thus, the signal D is fed to the counter 24 to count the number of zero-crossings every period T. The counter 24 is reset by a signal E having the period T.

The relation between the number of zero-crossings per second, No, and the resultant velocity V is given by $$No = \beta V, \qquad (2)$$

with the coefficient $\beta$ being defined by $$\beta = \frac{\sqrt{2}}{\pi} \left[ \frac{1}{w^2} + \frac{\sigma^2}{dx^2 + \Delta x^2} \left( 1 - \frac{dy^2 - dx^2}{dy^2 + \Delta x^2} \sin^2 \theta \right) \right]^{\frac{1}{2}} \qquad (3)$$

wherein $$\sigma = (R/\rho) + 1, \qquad (4)$$

R: the distance between the illuminated portion of the linear object and the photodiode 17,
$\rho$: the wavefront-curvature radius of the laser beam at the position where the linear object is present,
w: the radius of a circle approximate to the illuminated region S,
$\Delta x$: the average size of speckles,
dx: one half of the width of the elliptic aperture 16a along the minor axis (X-direction),
dy: one half of the width of the elliptic aperture 16a along the major axis (Y-direction), and
$\theta$: the angle between the direction of movement of the illuminated portion S of the linear object 10 and the direction of the minor axis of the elliptical aperture 16a. Since the linear object 10 is moving in the direction of its length (direction of the vector $V_L$ in FIG. 2) while vibrating, the illuminated portion S moves in the direction of the resultant velocity V. Because the direction of movement (length) of the linear object 10 matches the direction of the minor axis of the elliptic aperture 16a, this $\theta$ is equal to the angle between the velocity vectors V and $V_L$ (i.e., it is equal to $\theta$ shown in FIG. 2).

Figure 5:
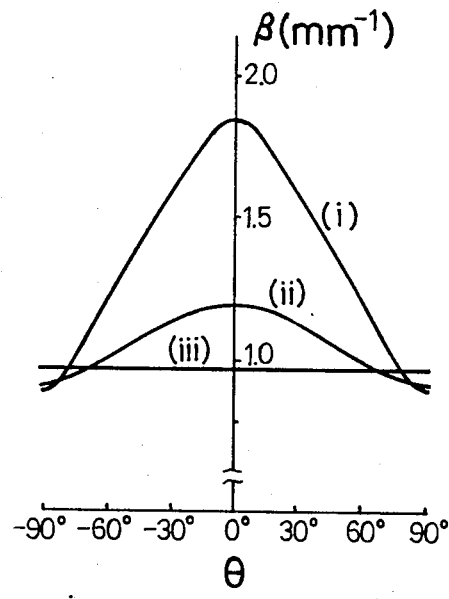
FIG. 5 is a graph showing the relationship between the angle $\theta$ and the constant $\beta$ involved in the finite-sized elliptic aperture.

FIG. 5 shows the relationship between the angle $\theta$ and the coefficient $\beta$ expressed by the equation (3). FIG. 5 is cited from the above-mentioned literature, i.e., Applied Physics 25, 179-194 (1981). With reference to this drawing, curve (i) is obtained when (dx, dy)=(1, 20), curve (ii) when (dx, dy)=(2, 10) and line (iii) when the finite-sized aperture is circular. The graph shows that when the degree of flatness of the elliptic aperture 16a is high, $\beta$ is generally proportional to $\cos \theta$ where $\theta$ is small. Suppose $\beta$ is $\beta_0$ when $\theta=0$, $\beta=k\beta_0 \cos\theta$ wherein k is a constant.

Accordingly the number of zero-crossings per second, No, provided by the counter 24 can be expressed as follows from the above relationship and the equations (1) and (2):

$$No = \beta V \quad (5)$$
$$= k\beta_0 V \cos\theta$$
$$= k\beta_0 V_L.$$

The equation (5) indicates that the number No is proportional to the longitudinal moving velocity $V_L$ of the linear object 10. The counter 24 counts the number of pulses in proportion to the longitudinal velocity $V_L$ of the object 10. In the velocity conversion circuit 25, the count of the counter 24 is multiplied by $1/k\beta_0$ to produce from the output terminal 26 an output signal corresponding to the moving velocity $V_L$ of the linear object. Thus, when the linear object 10 is moving in the direction of its length while vibrating, the output terminal 26 provides an output signal representing the longitudinal velocity $V_L$ of the object, so that the error due to the influence of the vibration is small.

The elliptic aperture 16a may be replaced by a slit aperture. Although the rise of the signal beyond the Schmitt level is taken for detecting the number of zero-crossings (so that strictly speaking, the number of pulses is ½ the number of zero-crossings) according to the embodiment described, pulses may be produced upon both rise and fall of the signal and counted as the number of zero-crossings.

The measurement of the moving velocity of a linear object in the direction of its length is useful, for example, for measuring the amount of feed of the linear object. Although the amount of feed of the linear object in FIGS. 1 and 2 can be measured also in terms of the amount of rotation of the rollers 11 and 12, the amount of feed can not be measured accurately by this method if slippage of the object occurs relative to the rollers 11 and 12. The measurement obtained according to the invention, when integrated over time, affords an accurate measurement of the feed amount even if slippage occurs.

What is claimed is:

1. A method of measuring the moving velocity of a linear object which is moving while vibrating, said object being a continuous solid substantially linear object, the method comprising the steps of:

illuminating the linear object with a flat laser beam having a width larger than the amplitude of vibration, the linear object moving in the direction of its length and vibrating perpendicular to the longitudinal direction, receiving the scattered light from the linear object by a photoelectric conversion device through a finite-sized elliptic or slit aperture which is disposed with the direction of its minor axis matching the direction of movement of the linear object, and cutting off the d.c. component of a speckle signal from the photoelectric conversion device, counting the number of zero-crossings per second of the resulting signal and converting the count value to a signal representing the longitudinal moving velocity of the linear object.

2. A method as defined in claim 1 wherein the direction of the width of the flat laser beam is perpendicular to the direction of the length of the linear object.

3. An apparatus for measuring the longitudinal moving velocity of a moving object which is moving in the direction of its length while vibrating in a direction perpendicular to said direction of its length, said object being a continuous solid substantially linear object, said apparatus comprising:

a light source for illuminating the moving object with a laser beam, light-blocking means formed with a finite-sized elliptic or slit aperture, means for receiving the light scattered by the moving object through the finite-sized aperture and converting the light to a speckle electric signal, means for cutting off a d.c. component from the speckle signal from the light-receiving means, counting the number of zero-crossings per second of the resulting signal and preparing from the count value data representing the moving velocity of the moving object, and means for converting the laser beam from the light source to a flat laser beam having a slender flat cross section and a width larger than the amplitude of the vibration of the linear object, the light-blocking means being disposed such that the direction of the minor axis of the finite-sized elliptic or slit aperture matches the direction of movement of the linear object.

* * * * *